United States Patent [19]
Thibodeaux

[11] 3,931,957
[45] Jan. 13, 1976

[54] LIFTING APPARATUS

[76] Inventor: John D. Thibodeaux, 4309 Los Angeles, Houston, Tex. 77026

[22] Filed: Apr. 25, 1975

[21] Appl. No.: 571,504

[52] U.S. Cl. .............................. 254/127; 214/86 A
[51] Int. Cl.² .......................... B66F 3/00; B60P 1/48
[58] Field of Search ............ 254/8 R, 8 B, 8 C, 9 R, 254/9 B, 9 C, 10 R, 10 B, 10 C, 124–127; 214/86 A, 130 R

[56] References Cited
UNITED STATES PATENTS

| | | | |
|---|---|---|---|
| 533,059 | 1/1895 | Harthan | 254/10 R |
| 1,751,480 | 3/1930 | Howell | 254/10 R |
| 2,512,150 | 6/1950 | Geren | 254/10 C |
| 3,051,337 | 8/1962 | Nelson | 214/86 A |
| 3,285,443 | 11/1966 | Gaumont | 214/86 A |
| 3,770,149 | 11/1973 | Aquila | 214/86 A |

Primary Examiner—Othell M. Simpson
Attorney, Agent, or Firm—Browning & Bushman

[57] ABSTRACT

Lifting apparatus for mounting on a support structure comprising first and second elongated guide assemblies each having an anchor end pivotally anchorable to said support structure for vertical pivotal movement and a movable end disposed to extend outwardly beyond the end of said support structure. The first guide assembly is disposed above the second guide assembly and has its anchor end disposed for anchoring to said support structure at a location spaced substantially inwardly from the end of said support structure, while the second guide assembly has its anchor end disposed for anchoring closer to the end of said support structure. A rigid base assembly is vertically pivotally connected to the movable ends of said guide assemblies to form a liftable assembly. Bulkhead means including object engagement means are mounted on said base assembly. Elevating means, mountable on said support structure, are provided for raising said liftable assembly.

28 Claims, 11 Drawing Figures

LIFTING APPARATUS

BACKGROUND OF THE INVENTION

1. Field of the Invention

The present invention relates to lifting apparatus for mounting on a support structure and particularly for mounting on a motor vehicle such as a flatbed truck to form a lifting-transporting vehicle. One of its main uses is in lifting one end of another vehicle and moving the latter to another location, i.e. to perform much the same function as a convention tow-truck, but in an improved manner. It can also be used to lift, and in some cases, to transport other large objects such as motors of vehicles and large garbage bins.

2. Description of the Prior Art

The lifting apparatus of a conventional tow truck includes one or more chains which are connected to the bumper or axle of a vehicle to be towed. The chain is then taken up by a winch assembly to bring the bumper of the vehicle firmly against one or more flexible straps. This causes the chains and/or the straps to bear against the lower portions of the bumper and/or underlying body portions of the vehicle as they curve around and under the end of the vehicle with a force equal to the weight being lifted. This almost inevitably causes damage to these parts of the vehicle. As the vehicle is being towed, it thrashes about on the chains and straps causing additional damage.

Several attempts have been made to improve on this conventional type of lifting apparatus for tow trucks. For example, U.S. Pat. No. 3,285,443 discloses a lifting and towing device in which the usual chains are replaced by a rigid structure which engages only the axle of the vehicle to be towed so that there is no bearing against the bumper and underlying body portions of the car. The device employs a parallelogram type linkage to maintain the rigid lifting members in substantially horizontal disposition as they are raised. The device suffers from several disadvantages. The parallelogram linkage is attached to the very end of the bed of the tow truck and extends outwardly therefrom. It is, of necessity, relatively small, delicate, and mechanically complicated. It does not have sufficient structural strength or stability to be directly lifted by the elevating means, and a separate boom must be provided. Finally, the device is only capable of raising and towing a vehicle and is not readily adaptable for other modes of operation. A similar device is shown in U.S. Pat. No. 3,051,337.

SUMMARY OF THE INVENTION

The present invention employs a pair of guide assemblies which operate in somewhat the same manner as a parallelogram linkage. However, the upper guide assembly is longer than the lower one so that its anchor end can be pivotally connected to the truck at a location spaced substantially inwardly from the rear end of the truck bed. The lower guide assembly also has its anchor end pivotally connected to the truck bed but at a location closer to the rear end of the bed. Both guide assemblies are mounted for vertical pivotal movement and have movable ends which extend outwardly beyond the rear end of the truck.

A base assembly is pivotally connected to the movable ends of the guide assemblies at vertically spaced locations for relative vertical pivoting between the base assembly and each of the guide assemblies. Thus, the base assembly and the guide assemblies form a liftable assembly. A bulkhead means is mounted on the base assembly and includes engagement means for engaging another vehicle or other object. An elevating means is mounted on the truck and connected to the liftable assembly, preferably to one of the guide assemblies, for raising the liftable assembly.

The guide assemblies are relatively large and mechanically uncomplicated. In fact, each guide assembly proper can be comprised of a single integral structure with no moving parts. The disposition of the anchor ends of the guide assemblies relative to each other and to the truck in itself provides much greater structural strength and stability than the prior art linkages and also allows the assemblies to be made larger and heavier than prior linkages. Thus, the elevating means can be connected directly to one of the guide assemblies so that the latter bears a substantial portion of the weight being lifted. If a boom is desired or needed, the upper guide assembly can serve this purpose also thereby further simplifying the apparatus.

Like a parallelogram linkage, the guide assemblies maintain a generally constant orientation of the base assembly and thus of the engagement means. Because the guide assemblies do not form a true paralleglogram, the orientation of the base assembly will change somewhat as the liftable assembly is raised and lowered. However, it can be maintained sufficiently constant for the purposes of the apparatus. Furthermore, the length and/or angle between the guide assemblies can be chosen so as to make the slight variation in orientation of the base assembly actually work to an advantage in lifting a vehicle.

In a preferred embodiment of the invention, the bulkhead is mounted for rotation about two axes, one vertical and the other horizontal. The apparatus then preferably includes first and second removable locking means for selectively locking the bulkhead against rotation about respective ones of these axes. Thus, the apparatus can be used with a swivelling bulkhead, as in towing a vehicle, or it can be used in much the same manner as a forklift with the bulkhead fixed with respect to the base assembly.

The engagement means are preferably removable from the bulkhead so that various types of engagement means can be interchanged. One of the preferred types of engagement means comprises a pair of generally horizontal lifting arms. These are placed under a vehicle to bear against the axles, A-frames or bumper. They may be of various lengths depending on the parts of the vehicle they are to engage. If the bumper of the vehicle is weak, damage to the bumper or body of the car can be avoided by engaging the axles or A-frames with the lifting arms, which do not then bear against the bumper, etc.

Other engagement means which can be used are: a chain hoist type device, ground gripping members for bracing the truck on an incline or the like, and devices designed to engage matching means on garbage bins.

Accordingly, it is a principle object of the invention to provide an improved apparatus for lifting a vehicle by its under-carriage parts without damage to the body of the vehicle.

Still another object of the invention is to provide a lifting apparatus comprising a pair of guide assemblies one having an anchor end anchored to a support at a location substantially spaced from the end of the support and the other having an anchor end anchored closer to the end of the support.

A further object of the invention is to provide a lifting apparatus including a bulkhead mounted for selective swivelling movement about vertical and horizontal axes with respect to a base assembly.

Yet another object of the invention is to provide a lifting apparatus having object engagement means which are removable and replaceable by other types of object engagement means.

Further objects, features, and advantages of the invention will be made apparent by the following detailed description of the preferred embodiments, the drawings, and the claims.

DETAILED DESCRIPTION OF THE PREFERRED EMBODIMENTS

Figure 1:
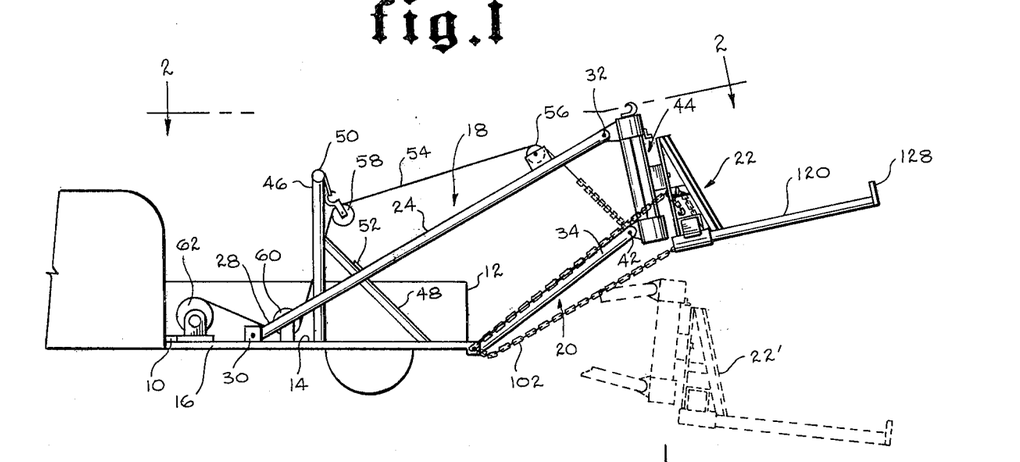
FIG. 1 is a side elevation of a lifting apparatus according to the invention mounted on a supporting truck.

Referring now to FIG. 1 there is shown a portion of a truck 10 which serves as a support structure for the lifting apparatus. The invention will be described herein as it would be used if mounted on a truck. However, it should be appreciated that the lifting apparatus could, depending on the specific application in which it is being used, be mounted on other types of supports such as other types of vehicles, platforms which rest on the ground, etc. The truck 10 has a rear end 12 which in use is disposed adjacent the object to be engaged and/or lifted and a bed 14 on which the lifting apparatus is mounted. Several of the parts of the lifting apparatus are directly mounted on a platform 16 which is in turn mounted on the bed 14 of the truck 10 so that these parts are mounted on the truck bed via platform 16.

Figure 2:
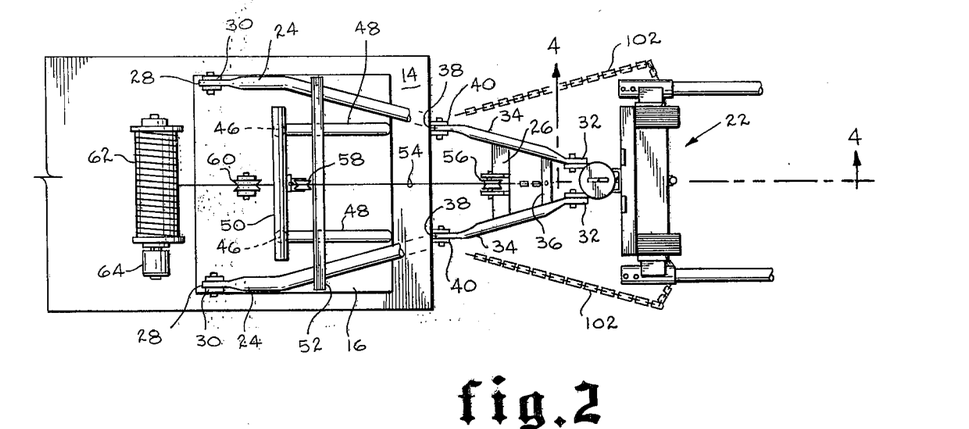
FIG. 2 is a top plan view of the apparatus of FIG. 1.
Figure 3:
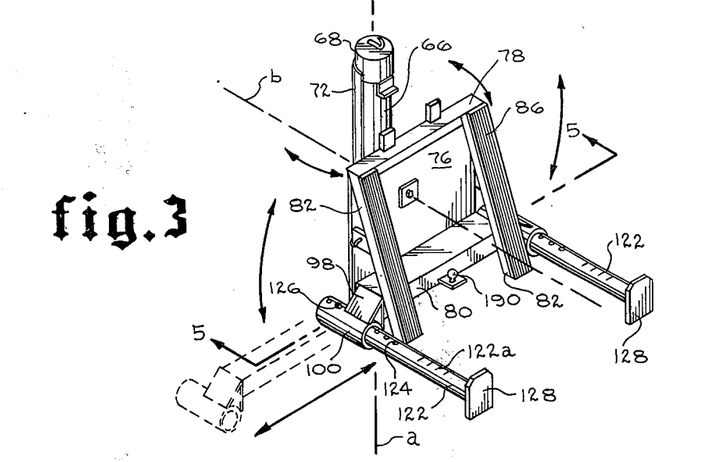
FIG. 3 is a perspective view of the base assembly and bulkhead means of the apparatus of FIGS. 1 and 2 but with a slightly different form of engagement means.
Figure 4:
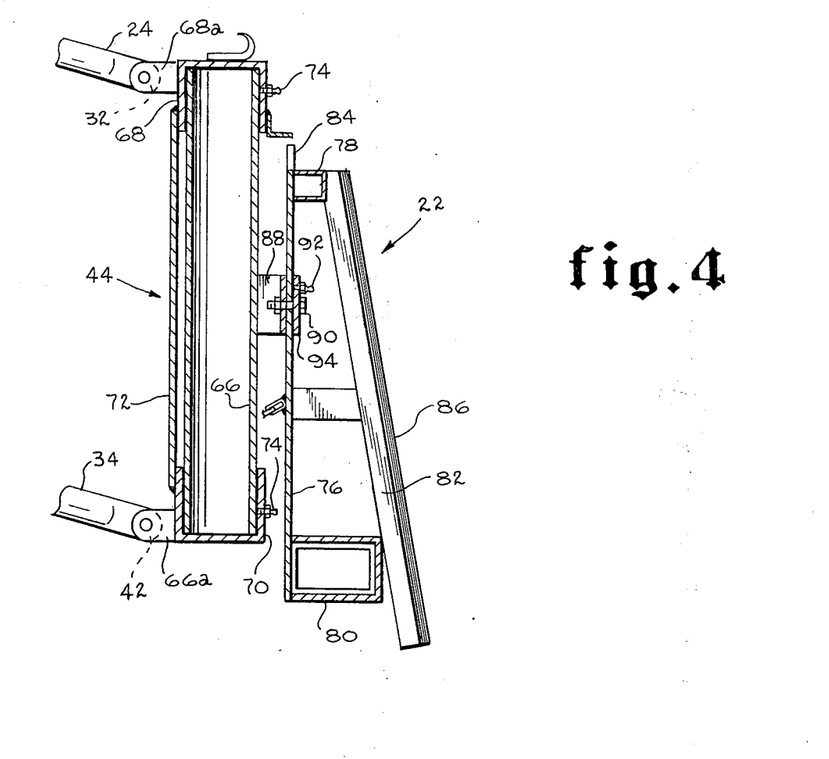
FIG. 4 is a cross-sectional view along lines 4—4 in FIG. 2.
Figure 5:
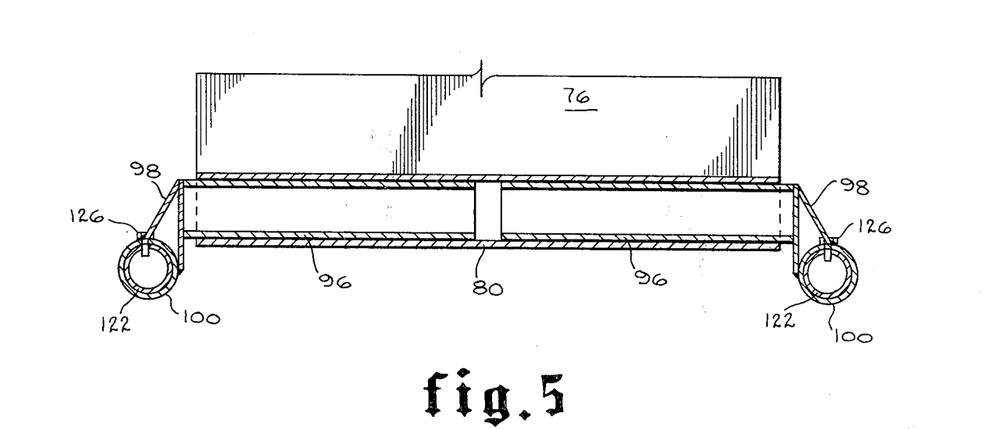
FIG. 5 is a cross-sectional view along lines 5—5 in FIG. 3.

It should be noted at this point that the terms "vertical" and "horizontal" as used herein will be construed with respect to the truck 10 as it would ordinarily appear on level ground and as it appears in FIG. 1. It will be understood that in actual use the truck, and thus the lifting apparatus, will not always maintain this orientation. Similarly, terms such as "longitudinal" and "lateral" will be construed herein with the truck 10 as a reference. The longitudinal direction will be from end-to-end of the truck (left to right as seen in FIG. 1). The lateral direction will generally be from side-to-side of the truck (top to bottom as seen in FIG. 2); however, for the bulkhead 22, the lateral direction will vary from that of the truck as the bulkhead 22 swivels about the axis in a manner to be more fully described below. Finally, it should be noted that all of the above terms are used herein in a general rather than a strict sense. For example, if a member is described as vertically extending, it will be understood that it has a substantial vertical component but might deviate by as much as about 30° from true vertical with respect to the truck.

The lifting apparatus comprises a pair of guide assemblies 18 and 20 each of which generally forms a rigid A-frame type structure. The upper or first guide assembly 18 comprises a pair of diverging legs 24 and a transverse bracing member 26. The divergent ends 28 of the guide assembly 18 together comprise the anchor end of the guide assembly 18 which is pivotally anchored to the support structure for vertical pivotal movement with respect thereto. It should be noted that "vertical pivotal movement" as used herein will mean that as a member moves, any point on the member defines a vertical plane. Each of the ends 28 is vertically pivotally connected to a respective bracket 30 carried by the platform 16 at a location spaced substantially inwardly from the end 12 of the truck 10. The opposite ends 32 of the legs 24 comprise the movable end of the guide assembly 18 and extend out beyond the end 12 of the truck. The second or lower guide assembly 20 also comprises a pair of diverging legs 34 and a transverse bracing member 36. The divergent ends 38 of the legs 34 comprise the anchor end of the guide assembly 20. Each of the ends 38 is pivotally anchored to a respective bracket 40 on the bumper of the truck 10 for vertical pivotal movement. The anchor ends of the two guide assemblies are disposed at about the same level (vertically) on the truck 10. However, while the anchor end of assembly 18 is spaced substantially inwardly from the end 12, the anchor end of assembly 20 is disposed precisely at or closely adjacent end 12. The ends 42 of the legs 34 comprise the movable end of the guide assembly 20 and extend out beyond the end 12 of the truck.

The ends 32 of the legs 24 are vertically pivotally connected to a generally vertical base assembly 44. Ends 42 of legs 34 are also vertically pivotally connected to base assembly 44 below the ends 32. Thus the base assembly 44 together with the guide assemblies 18 and 20 comprises a liftable assembly which can be raised and lowered with respect to the truck 10. The bulkhead 22 is mounted on the base assembly 44 generally opposite the guide assemblies 18 and 20 so that it can be raised and lowered with the liftable assembly 18, 20, 44.

The liftable assembly 18, 20, 44 is raised and lowered by elevating means mounted on the truck 10. The elevating means comprises a mast assembly including two parallel vertical masts 46 mounted on the platform 16. Each of the masts 46 is supported by a respective diagonal support 48 also mounted on the platform 16. The tops of the masts 46 are connected by a cross bar 50. An elongate cross piece 52 is rigidly connected to the supports 48 so that it can intersect guide assembly 18 in its upward motion to serve as a stop for the liftable assembly. The liftable assembly is raised by a flexible member 54 comprising a short length of chain attached to the liftable assembly and a longer section of cable. The cable passes over a sheave 56 carried by the transverse bracing member 26 of assembly 18, over a sheave 58 carried by cross bar 50, under a sheave 60 mounted on the platform 16, and around a winch reel 62 mounted on the bed 14 of the truck 10. The reel may be rotated by a reversible motor 64 to pull in the cable thereby lifting the liftable assembly, or to play out the cable so that the liftable assembly drops under the force of its own weight. Alternatively, the winch reel 62 may be suitably connected to the drive shaft of the truck 10 and rotated thereby. While the chain end of the flexible member 54 can be attached to any part of the liftable assembly, it is preferably attached to the transverse bracing member 36 of assembly 20 which is located adjacent the base assembly 44. In the embodiment shown in FIGS. 1 and 2 the upper guide assembly 18 with its sheave 56 serves as a boom. However, it will be appreciated that in some instances, particularly in smaller units, the cable could pass directly from sheave 58 to the liftable assembly.

Turning now to FIGS. 3-6, it will be seen that the base assembly 44 comprises a generally cylindrical member 66. Cylindrical member 66 is mounted for rotation about its own generally vertical axis by bearing caps 68 and 70 which fit over the upper and lowers ends of cylincrical member 66 respectively. The caps 68 and 70 are spaced apart by a spacer 72 welded or otherwise affixed to the caps 68 and 70. Caps 66 and 68 each carry a respective pair of brackets 66a and 68a to which ends 42 of the legs of the upper guide assembly 18 and ends 32 of the legs of the lower guide assembly 20 are respectively pivoted. The spacer 72 is preferably disposed on the same side of the base assembly 44 as the guide assemblies 18 and 20. Grease fittings 74 are provided for lubricating the area between the cylindrical member 66 and the caps 68 and 70.

The bulkhead 22 is mounted on the cylindrical member 66 generally on the opposite side from the spacer 72 and guide assemblies 18 and 20. (The position of bulkhead 22 with respect to the spacer 72, etc. will change somewhat as it swivels on axis $a$; hence it is described as "generally" opposite those parts.) The bulkhead 22 comprises a generally vertically extending plate 76. A laterally extending rectangular tube 78 is rigidly attached to the upper end of plate 76 on the side opposite or distal the base assembly 44. A large laterally extending rectangular tube 80 is attached to the lower end of plate 76 on the same side as tube 78. A pair of bumpers 82 are each rigidly attached to the tubes 78 and 80 and spaced from plate 76 thereby. Since tube 80 extends out farther from plate 76 than tube 78, the bumpers 82 slant away from plate 76 from top to bottom. Bumpers 82 have rubber padding 86 on their outer faces.

A bracket 88 is rigidly affixed to the cylindrical member 66 and extends radially therefrom. The plate 76 is pivotally mounted on bracket 88 by a pin 90 for rotation about horizontal axis $b$. When the bulkhead is adjusted on the axis a to the position shown in FIGS. 1 and 2, axis b extends generally longitudinally of the truck 10. However, its position will change as the bulkhead 22 swivels on axis $a$. A plate 94 is provided on the opposite side of plate 76 from bracket 88, and a grease fitting 92 is provided in plate 94 to lubricate the area between the relatively rotating parts.

It will be appreciated that if swivelling of the bulkhead is not desired in a particular unit, a single integral part could be vertically pivotally mounted on the ends 32, 42 of the guide assemblies which part would form both base assembly and bulkhead. The part would perform all the functions of the base assembly and bulkhead except for the above-mentioned swivelling.

The plate 76, tubes 78 and 80, and bumpers 82 comprise the main body of the bulkhead 22. A pair of slides 96 are slidably carried in tube 80 for lateral extension and retraction. At the laterally outer end of each slide 96, outside the tube 80, is a bracket 98, and carried by each bracket 98 is a cylindrical holder 100 generally parallel with the axis b. Various types of engagement means, to be described more fully below, can be removably mounted in the holders 100.

It will be appreciated that the rotatable mounting of cylindrical member 66 provides a first swivel means for pivotal movement of the bulkhead 22 about the generally vertical axis a. The pivotal attachment of the plate 76 to the cylindrical member 66 by the pin 90 provides second swivel means for pivotal movement of the bulkhead 22 about the generally horizontal axis b. This allows the bulkhead 22 to be manipulated to properly engage objects which are in various positions with respect to the truck 10. It also allows a vehicle being towed by the truck to follow the truck as it passes around curves and over uneven areas. In some instances for example, when the lifting apparatus is being used as a forklift, it is necessary to lock the bulkhead against pivotal movement on one or both of the swivel means. For this reason, removable first and second locking means are provided.

The first locking means comprises a pair of chains 102 (see FIGS. 1 and 2). Each chain 102 has one end attached to the plate 76. From that point the chain extends back to the truck 10 and is secured to a respective one of the brackets 40 or any other suitable means. From the bracket 40 the chain extends back toward the bulkhead, under a respective one of the brackets 98 and up to a small plate welded between plate 76 and a respective one of the bumpers 82. A hook or other connecting member is carried by the small plate whereby the chain can be adjustably attached thereto. When both chains 102 are made taut between the truck 10 and the bulkhead 22, the cylindrical member 66 and bulkhead 22 are prevented from swivelling about axis a.

Figure 6:
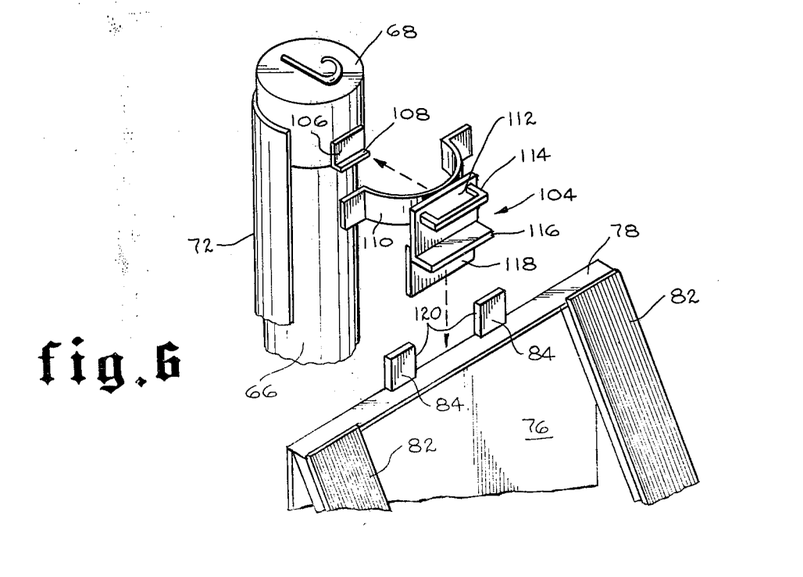
FIG. 6 is an exploded view of a removable locking means with the engageable portions of the base assembly and bulkhead means.
Figure 7:
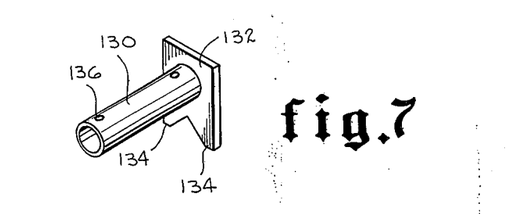
FIG. 7 is a perspective view of a first alternative form of engagement means.

The second locking member is shown in FIG. 6 where it is generally indicated by the numeral 104. An angle holder 100 is rigidly secured to the bearing cap 68 of the base assembly 44 on the side generally opposite spacer 72. The holder 106 has one leg 108 extending generally radially from the base assembly. The locking member 104 comprises a curved member 110 the lower edge of which rests on leg 108 of holder 106 to support the locking member and the inner curve of which engages the base assembly. Welded to the outer curve of member 110 and depending downwardly therefrom is a plate 112. A handle 114 is attached to plate 112 on the side opposite or distal member 110. A block 116 is welded to the same side of plate 112 below handle 114. A second plate 118 is welded to the lower portion of the plate 112 on the same side as member 110. Two small blocks 84 are provided on the upper surface of the tube 78 of the bulkhead. The blocks 84 have abutment surfaces 120 facing each other and spaced apart in a direction transverse to the axis b.

tion generally opposite the base assembly, and carries object gripping means.

Figure 8:
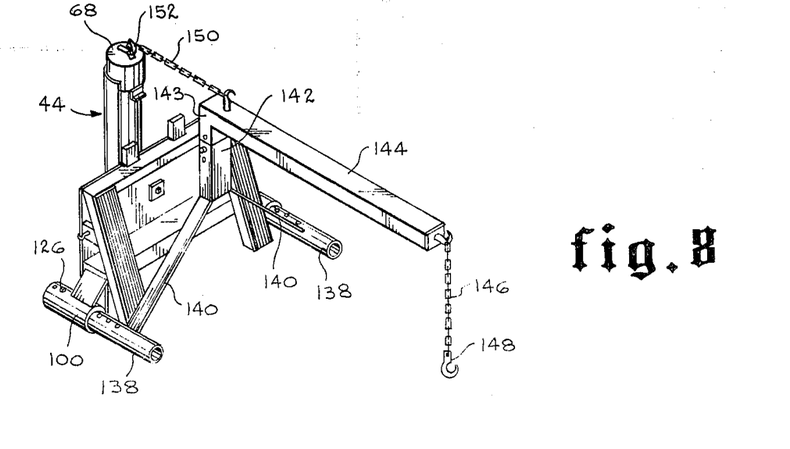
FIG. 8 is a perspective view of a second alternative form of engagement means mounted on the bulkhead means and base assembly.

Referring to FIG. 8 for example, the foundation comprises a pair of parallel cylindrical elements 138 which can be secured in a desired position in the holders 100 by pins 126 in the same manner as the other engagement means described above. The two elements 138 are connected by a pair of upstanding converging bars 140 whose upper ends are joined by a generally vertical rectangular tube 142. The carrier comprises a generally vertical stud 143, vertically adjustable in tube 142 in a manner to be more fully described in connection with the embodiment of FIG. 9. The carrier also comprises a generally horizontal leg 144 which extends away from the foundation in a direction generally opposite the base assembly 44. At the free end of leg 144 is a chain 146 and a hook 148 which forms the object gripping means. It will be appreciated that when the liftable assembly is raised, an object gripped by the hook 148 can be lifted. A chain 150 can be used to secure the carrier to the base assembly 44 for greater stability, and a hook 152 may be provided on the upper bearing cap 68 for this purpose. It will be appreciated that the engagement means of FIG. 8 is a chain hoist type of apparatus and that it could be used to lift a heavy object such as the engine of a vehicle or to lift the vehicle itself in instances in which the lifting arms 120 or 122 cannot readily be used.

Figures 9, 10, 11:
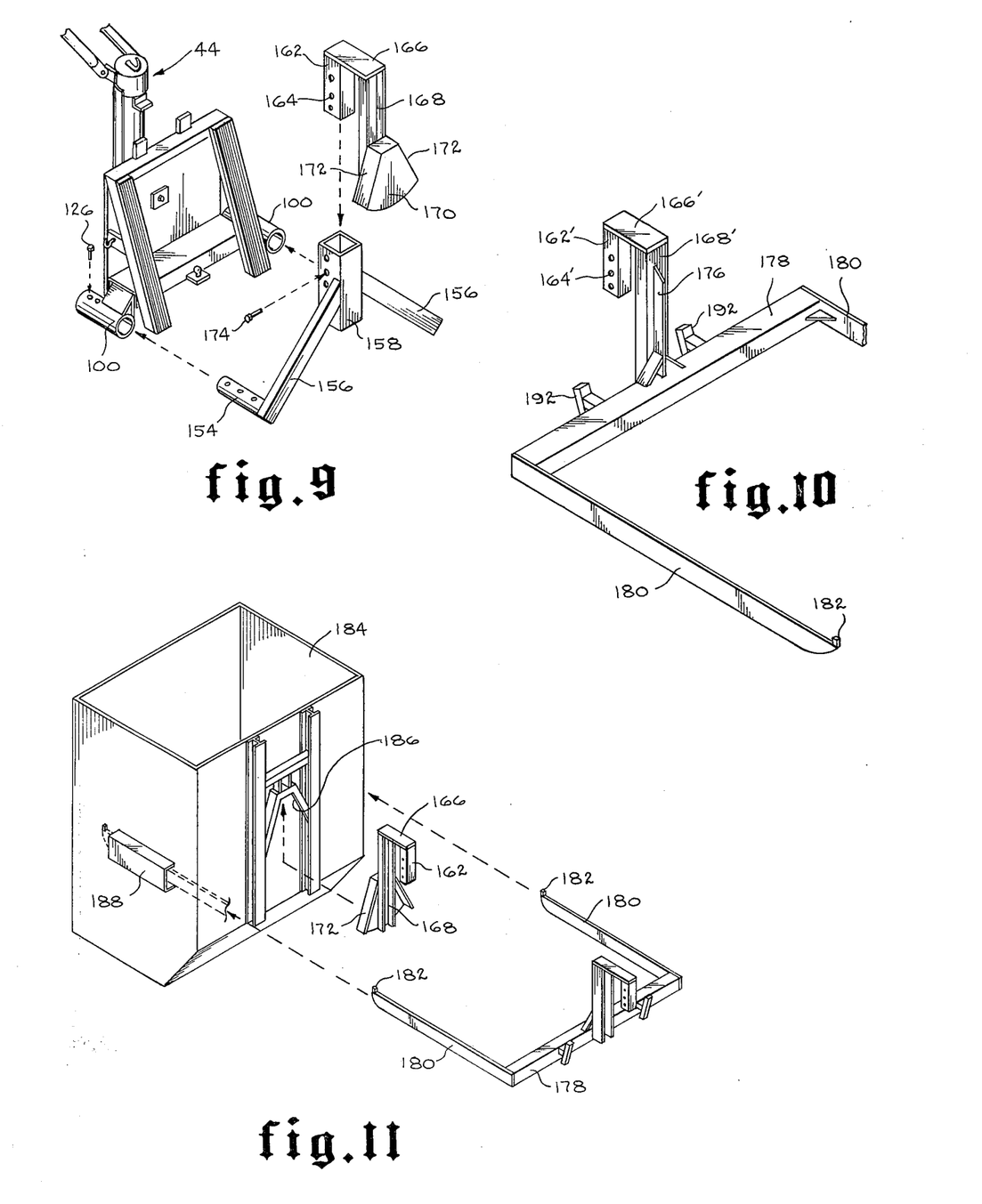
FIG. 9 is an exploded view of a third alternative form of engagement means with the bulkhead means and base assembly.
FIG. 10 is a perspective view of an alternative form of carrier for use with the foundation means of FIG. 9.
FIG. 11 is an exploded view showing the manner in which the gripping means of FIGS. 9 and 10 relate to a garbage bin to be lifted.

The engagement means of FIGS. 9 and 10 are designed to adapt the lifting apparatus for lifting and transporting standard garbage bins. In FIG. 9 the foundation part of the engagement means is identical to that of FIG. 8. It comprises a pair of cylindrical parts 154 which fit into holders 100 and are secured therein in various positions by means of pins 126. Upstanding bars 156 depend from respective ones of the cylindrical parts 154 and converge toward each other. Bars 156 are joined by a generally vertical rectangular tube 158. The carrier comprises a generally rectangular stud 162 sized to fit into tube 158. Tube 158 contains a plurality of holes 160 and stud 162 contains a plurality of matching holes 164. The carrier can be vertically adjusted by aligning appropriate ones of the holes 160 and 164 and then securing stud 162 to tube 158 by placing a pin 174 through the aligned holes 160, 164. (The vertical adjustment of the carrier of FIG. 8 is identical). The carrier further comprises a leg 166 extending from the top of stud 162 generally horizontally away from the foundation in a direction generally opposite the base assembly 44. Another leg 168 depends downwardly from the far end of leg 166 and carries a generally trapezoidal cam member 170 with cam surfaces 172 which flare outwardly from top to bottom. As shown in FIG. 11, a standard garbage bin 184 may comprise means defining a mating trapezoidal recess 186 in which the cam member 170 can fit to lift the bin 184.

FIG. 10 shows a second form of carrier to be used with the foundation of FIG. 9. This carrier is similar to that of FIG. 9 in that it comprises a rectangular stud 162' having holes 164', a horizontal leg 166' and a vertical leg 168'. It differs from the carrier of FIG. 9 in that the leg 168' is longer than the leg 168 and is reinforced at 176. The object gripping means is also different. It comprises a cross bar 178 carried on the lower end of the leg 168'. A pair of parallel lifting arms 180 extend generally horizontally from the cross bar 178 in a direction generally opposite the base assembly. Bracing blocks 192 may be mounted on cross bar 178 for abutment with bars 156 to help stabilize the structure. As shown in FIG. 11 the bin 184 may be provided with means 188 on each side defining a pair of channels for receipt of the arms 180. Stops 182 are provided on the arms 180 to prevent the bin from slipping off the arms 180.

It will be appreciated that the manner in which the guide assemblies 18 and 20 maintains a generally horizontal orientation of the holders 100 cooperates with the gripping means of either FIG. 9 or FIG. 10 to lift the garbage bin without substantial lilting.

Referring once again to FIG. 3, it will be noted that a trailer hitch 190 is mounted on tube 80 on the opposite of bulkhead 22 from base assembly 44. The height of the trailer hitch 190 can be adjusted by raising or lowering the liftable assembly and bulkhead. This in turn allows adjustment for trailers of various lengths so that the trailer will not be disposed at an undesirable angle with respect to the ground.

The lifting apparatus of the present invention provides a vehicle lifting and towing means which can lift one end of a vehicle to tow the latter without damage to the bumper and body of the vehicle. The guide assemblies provide a modified parallelogram arrangement which is much more advantageous than the linkages of the prior art. It is simpler and stronger than the prior art linkages. Additionally, it can be designed so that its deviation from parallelogram movement works to an advantage in lifting a vehicle.

The apparatus can also be readily adapted for many other uses such as motor hoisting, truck bracing, garbage bin transport, etc. by means of the various engagement means. Thus it provides a relatively inexpensive all purpose lifting apparatus.

It will be appreciated that the particular structural details of the preferred embodiments described above could be altered in various ways without departing from the spirit of the invention. It is therefore intended that the scope of the invention be limited only by the claims which follow.

I claim:

1. Lifting apparatus for mounting on a supporting structure having an end, said lifting apparatus comprising:
    a first guide assembly having an anchor end pivotally anchorable to said support structure at a location spaced substantially inwardly from the end of said support structure for vertical pivotal movement and a movable end disposed to extend outwardly beyond the end of said support structure;
    a second guide assembly disposed below said first guide assembly and having an anchor end pivotally anchorable to said support structure at a location closer to the end of said support structure than the location of the anchor end of said first guide assembly for vertical pivotal movement and a movable end disposed to extend outwardly beyond the end of said support structure;
    a rigid base assembly pivotally connected to the movable ends of said guide assemblies at vertically spaced points for relative vertical pivotal movement between said base assembly and each of said guide assemblies whereby said base assembly and said guide assemblies comprise a liftable assembly;
    bulkhead means mounted on said base assembly and including engagement means for engaging an object;

and elevating means mountable on said support structure and connected to said liftable assembly for raising said liftable assembly with respect to said support structure.

2. The lifting apparatus of claim 1 wherein said second guide assembly is shorter than said first guide assembly and the anchor end of said second guide assembly is disposed for anchoring closely adjacent the end of said support structure.

3. The lifting apparatus of claim 1 wherein said elevating means comprises a mast assembly rigidly mountable on said support structure to extend vertically upwardly therefrom and having an upper end, an elongate flexible member movably connected to said mast assembly adjacent said upper end, said flexible member having an end portion connected to said liftable assembly, and drive means connected to said flexible member and operative to pull said end portion of said flexible member toward said mast assembly.

4. The lifting apparatus of claim 3 wherein the end portion of said flexible member is connected to said second guide assembly adjacent said base assembly.

5. The lifting apparatus of claim 4 wherein said first guide assembly includes means for movably receiving a portion of said flexible member between said mast assembly and said second guide assembly.

6. The lifting apparatus of claim 1 including first swivel means cooperative between said base assembly and said bulkhead means for allowing pivotal movement of said bulkhead means about a generally vertical axis.

7. The lifting apparatus of claim 6 further comprising first locking means removably connectible to said bulkhead means to prevent pivotal movement of said bulkhead means on said first swivel means.

8. The lifting apparatus of claim 1 including second swivel means cooperative between said base assembly and said bulkhead means for allowing pivotal movement of said bulkhead means about a generally horizontal axis.

9. The lifting apparatus of claim 8 further comprising second locking means removably connectible to said bulkhead means to prevent pivotal movement of said bulkhead on said swivel means.

10. The lifting apparatus of claim 1 wherein said base assembly comprises a bearing portion having the movable ends of said guide assemblies connected thereto and a rotary portion mounted in said bearing portion for rotation about a generally vertical axis and wherein said bulkhead means is attached to said rotary portion generally opposite said guide assemblies for rotation with said rotary portion.

11. The lifting apparatus of claim 10 wherein said rotary portion of said base assembly comprises a generally vertical cylindrical element, and wherein said bearing portion comprises a pair of bearing caps disposed over respective ends of said cylindrical element and a spacer rigidly connected to each of said two caps and disposed generally on the opposite side of said base assembly from said bulkhead means.

12. The lifting apparatus of claim 10 further comprising a pair of laterally spaced first locking members removably connectible to said bulkhead means and to said support structure to prevent rotation of said cylindrical element and said bulkhead means about said generally vertical axis.

13. The lifting apparatus of claim 10 wherein said bulkhead means is rotatably mounted on said cylindrical element for rotation about a generally horizontal axis.

14. The lifting apparatus of claim 13 wherein said bulkhead means includes means defining a pair of abutment surfaces facing each other and spaced apart in a direction transverse to said generally horizontal axis said lifting apparatus further comprising a second locking member removably interconnectible between said cylindrical element and said bulkhead and including means for engaging said cylindrical element and means disposed between said abutment surfaces and abutting said abutment surfaces to prevent rotation of said bulkhead about said generally horizontal axis.

15. The lifting apparatus of claim 13 wherein said base assembly further comprises a holder on said cylindrical element for supporting said second locking member.

16. The lifting apparatus of claim 1 wherein said bulkhead means includes a main body portion, and holding means carried by said main body portion, said engagement means being removably mounted on said holding means.

17. The lifting apparatus of claim 16 wherein said engagement means is generally horizontally longitudinally adjustable with respect to said holding means.

18. The lifting apparatus of claim 17 wherein said engagement means extends away from said main body portion in a direction generally opposite said base assembly and wherein said bulkhead means further comprises bumper means disposed between said main body portion and the outer extremity of said engagement means.

19. The lifting apparatus of claim 16 wherein said holding means comprises two laterally spaced holder members each laterally extensible and retractable with respect to said main body portion, and wherein said engagement means comprises two engagement members each of which is mounted on a respective one of said holder members.

20. The lifting apparatus of claim 16 wherein said engagement means comprises a pair of generally horizontal lifting arms extending away from said main body portion in a direction generally opposite said base assembly.

21. The lifting apparatus of claim 20 wherein each of said lifting arms includes a rigid upstanding retaining element distal said main body portion.

22. The lifting apparatus of cliam 16 wherein said engagement means comprises a pair of laterally spaced ground gripping members each having a generally downwardly directed tooth.

23. The lifting apparatus of claim 16 wherein said engagement means comprises a foundation part mounted on said holding means and upstanding therefrom and a carrier part on said foundation part extending generally horizontally from said foundation part in a direction generally opposite said base assembly, and object gripping means carried by said carrier part.

24. The lifting apparatus of claim 23 wherein said carrier part is adjustable with respect to said foundation part in a generally vertical direction.

25. The lifting apparatus of claim 23 wherein said object gripping means comprises hook means flexibly suspended from said carrier part.

26. The lifting apparatus of claim 23 wherein said object gripping means comprises a cam member having cam surfaces which flare outwardly from top to bottom.

27. The lifting apparatus of claim 23 wherein said object gripping means comprises a pair of generally horizontal lifting arms extending away from said carrier part in a direction generally opposite said base assembly.

28. The lifting apparatus of claim 1 further comprising trailer hitch means carried by said bulkhead means.

* * * * *